(12) United States Patent
Sherman et al.

(10) Patent No.: US 7,460,860 B2
(45) Date of Patent: Dec. 2, 2008

(54) METHOD AND SYSTEM FOR PROVIDING A MOBILE NETWORK NOTIFICATION SERVICE

(75) Inventors: Stephen K. Sherman, Alpharetta, GA (US); Douglas R. O'Neil, Marietta, GA (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 105 days.

(21) Appl. No.: 11/373,438

(22) Filed: Mar. 10, 2006

(65) Prior Publication Data

US 2006/0154650 A1    Jul. 13, 2006

Related U.S. Application Data

(63) Continuation of application No. 10/696,614, filed on Oct. 29, 2003, now Pat. No. 7,020,460.

(51) Int. Cl.
    *H04M 1/66* (2006.01)
(52) U.S. Cl. .................. 455/415; 455/412.2; 455/416

(58) Field of Classification Search ................ 455/415, 455/416, 435.1, 424, 425, 517, 518, 519, 455/412.2
See application file for complete search history.

(56) References Cited

U.S. PATENT DOCUMENTS

| | | | |
|---|---|---|---|
| 6,512,930 B2 * | 1/2003 | Sandegren | ................. 455/518 |
| 6,728,754 B1 | 4/2004 | Lipton | |
| 6,738,461 B2 | 5/2004 | Trandal et al. | |
| 6,888,927 B1 | 5/2005 | Cruickshank et al. | |
| 7,020,460 B1 * | 3/2006 | Sherman et al. | ............ 455/415 |
| 2005/0004984 A1 | 1/2005 | Simpson | |

* cited by examiner

*Primary Examiner*—CongVan Tran
(74) *Attorney, Agent, or Firm*—Cantor Colburn LLP

(57) ABSTRACT

A method for providing a mobile network notification service including receiving a first telephone number associated with a first notification service customer. The method further includes receiving an indication that a first telephone corresponding to the first telephone number has been powered on and is available in a mobile network. A mobile network status of a second telephone corresponding to a second telephone number is determined in response to locating the second telephone number in a notification list associated with the first notification service customer. The status is transmitted to the first notification service customer.

25 Claims, 6 Drawing Sheets

METHOD AND SYSTEM FOR PROVIDING A MOBILE NETWORK NOTIFICATION SERVICE

CROSS-REFERENCE TO RELATED APPLICATIONS

This application is a continuation of U.S. patent application Ser. No. 10/696,614, filed Oct. 29, 2003, now U.S. Pat. No. 7,020,460, the entire contents of which are incorporated herein by reference.

FIELD OF THE INVENTION

The present disclosure relates generally to a method of providing a mobile network notification service and in particular, to a method of notifying a customer if particular telephone numbers are in communication with the mobile network.

BACKGROUND OF THE INVENTION

Wireless communication systems are utilized to facilitate communication between a wireless mobile unit and other wireless mobile units as well as between wireless mobile units and customers of wired units, such as those attached to a public switched telephone network (PSTN). Wireless communication systems operate according to communication protocols within allocated frequency bands and on particular radio frequency (RF) channels contained within the frequency bands. Frequency bands currently in use in North America and around the world for wireless communications include the 800 MHz (cellular) band and the 1900 MHz (personal communication services (PCS)) band among others.

Various standardized communication protocols have been developed for wireless communication systems. These standardized protocols include, for example, the Advanced Mobile Phone Service (AMPS) standards, the Global Standards for Mobility (GSM), the Code Division Multiple Access (CDMA) and the Time Division Multiple Access (TDMA) standard. These standards support interoperability of equipment manufactured by differing vendors.

Wireless communication systems are generally constructed according to a hierarchy in which mobile switching centers (MSCs) (or mobile telephone exchanges (MTXs)) reside atop the hierarchy. The MSCs couple to the PSTN and also typically couple to packet data networks (PDNs) such as the Internet via an inter-working function. In this hierarchy, each MSC (or MTX) services a plurality of base station controllers (BSCs) each of which services a plurality of base stations. The base stations establish wireless links with serviced mobile units. In this hierarchy, all calls (voice or packet data communications) are routed through the MSC (or MTX).

Cellular telephones provide convenience and safety to customers by giving customers the ability to make and receive telephone calls from any location where cellular services are available. The ability to receive telephone calls is limited to the times when the telephone is turned on. When the telephone is turned off, a caller will normally receive an announcement provided by the cellular service provider, or carrier, that the customer is currently unavailable or is not within a service area. With some systems, a caller calling when a customer's telephone is turned off will be able to leave a voice message for the customer. The customer can then retrieve such a message by calling into the service provider. Currently, a caller cannot tell if a customer's telephone is turned on and connected to the mobile network without calling the customer's telephone number.

SUMMARY OF THE INVENTION

Figure 1:
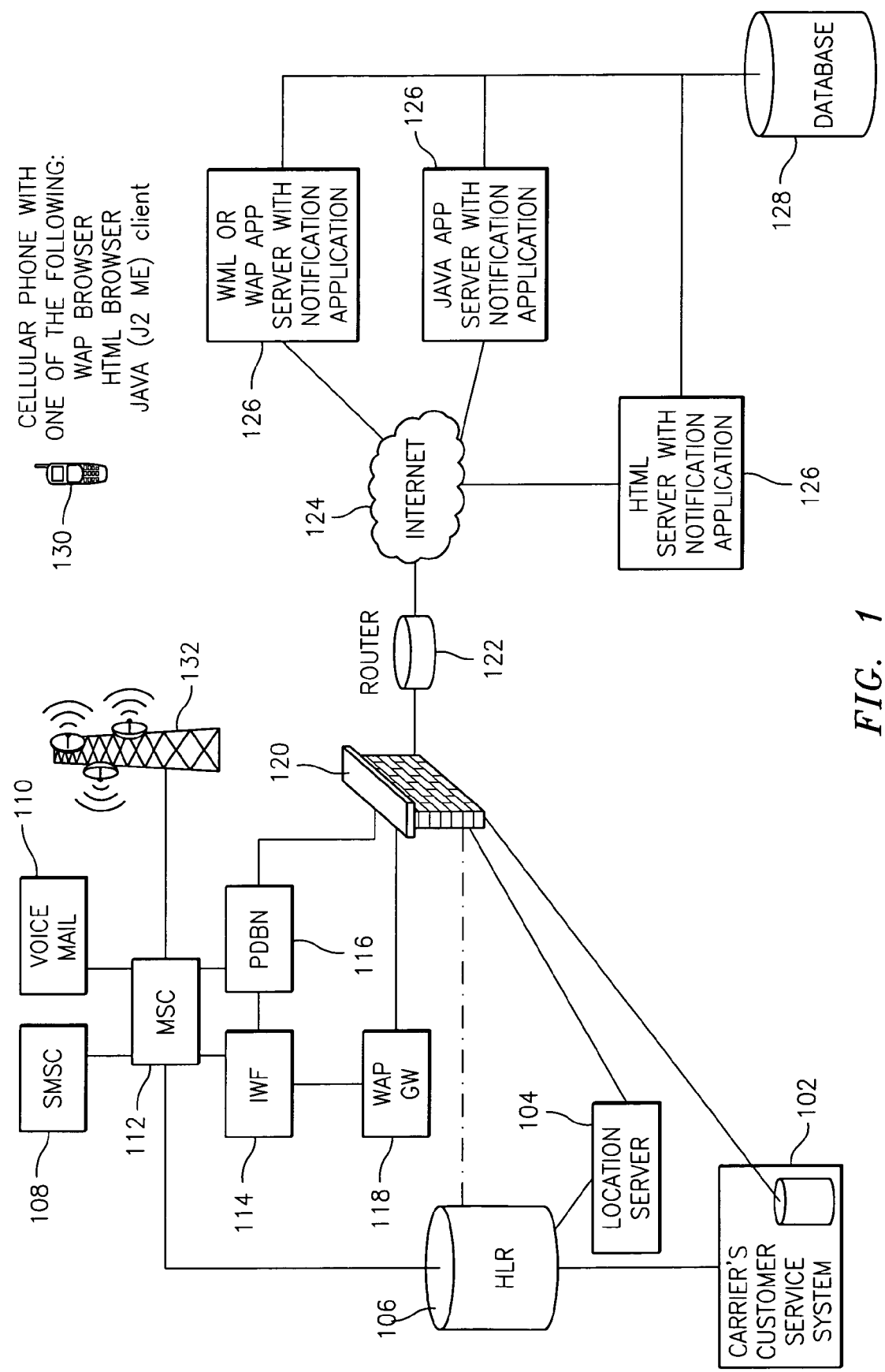
FIG. 1 is a block diagram of an exemplary system for providing a mobile network notification service.

Embodiments of the invention include a method for providing a mobile network notification service. The method includes receiving a first telephone number associated with a first notification service customer. The method further includes receiving an indication that a first telephone corresponding to the first telephone number has been powered on and is available in a mobile network. A mobile network status of a second telephone corresponding to a second telephone number is determined in response to locating the second telephone number in a notification list associated with the first notification service customer. The status is transmitted to the first notification service customer.

Other embodiments include a system for providing a mobile network notification service. The system includes a network, an application server in communication with the network, and a first telephone in communication with the network. The first telephone corresponds to a first telephone number and is associated with a first notification service customer. The first telephone also includes instructions to implement a method including transmitting an indication to the application server via the network that the first telephone has been powered on and is available in a mobile network. The method further includes transmitting a request to the application server to determine a mobile network status of a second telephone, corresponding to a second telephone number, in response to locating the second telephone number in a notification list associated with the first notification service customer. The status is received via the network and displayed on the first telephone.

Additional embodiments include a system for providing a mobile network notification service. The system includes a network and an application server in communication with the network. The application server includes instructions to implement a method including receiving a first telephone number associated with a first notification service customer via the network. The method also includes receiving an indication via said network that a first telephone corresponding to the first telephone number has been powered on and is available in a mobile network. A mobile status of a second telephone corresponding to a second telephone number is determined in response to locating the second telephone number in a notification list associated with the first notification service customer. The status is transmitted to the first notification service customer via the network.

Further embodiments include a computer program product for providing a mobile network notification service. The computer program product includes a storage medium readable by a processing circuit and storing instructions for execution by the processing circuit for performing a method including receiving a first telephone number associated with a first notification service customer. The method further includes receiving an indication that a first telephone corresponding to the first telephone number has been powered on and is available in a mobile network. A mobile network status of a second telephone corresponding to a second telephone number is determined in response to locating the second telephone number in a notification list associated with the first notification service customer. The status is transmitted to the first notification service customer.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF THE INVENTION

Exemplary embodiments of the present invention provide the ability for a mobile telephone customer of a provider network to know when another mobile customer of the provider network (or another provider network that has partnered with the provider network or partnering Internet Service Providers (ISP's)) has their telephone turned on in the mobile network. Given this knowledge, the mobile telephone customer may then call the other mobile customer or send the other mobile customer a message using an instant messaging facility as is known in the art. This ability to determine if another mobile customer has their telephone turned on in the mobile network may be provided by a network based solution utilizing a browser for provisioning. Alternatively, this ability may be provided by utilizing software that communicates with the provider network and has been loaded into a cellular telephone (e.g., at point of purchase, downloaded, flash upgrade). Exemplary embodiments of the present invention create an option for a mobile telephone customer who enters a telephone number into the telephone memory to allow other mobile subscriber customers to see when the customer's telephone is powered on and within the mobile network.

In exemplary embodiments of the present invention, the notification service may be supported by utilizing the information that is communicated to an HLR or location server regarding the status of mobile subscribers. A modification to the existing software on an HLR may be written to manage this, or alternatively an additional server may be created to specifically manage the status of mobile customers. Software is installed on customer telephones to run the notification application. The notification application manages the list of the individual mobile customers and their status. The application also communicates with the mobile network to send and receive status updates.

FIG. 1 is a block diagram of an exemplary system for providing a mobile network notification service. The system includes a cellular telephone 130 containing connection software such as a wireless application protocol (WAP) browser or a hypertext markup language (HTML) browser when the notification application resides on an application server 126. Alternatively, the cellular telephone 130 may include a Java client (e.g., J2ME, binary runtime environment for wireless (BREW), other similar client) or any other type of client known in the art when portions of the notification application reside in the cellular telephone 130 and other portions of the notification application reside on an application server 126. The system depicted in FIG. 1 includes a standard wireless telephone network environment with elements including a base station 132 for receiving telephone calls from cellular telephones 130, a mobile switching center (MSC) 112 in communication with a short messaging service center 108 (SMSC), a voice mail system 110, a home location register 106 (HLR), an IWF 114 and a packet data backbone network 116 (PDBN). The IWF 114 is also in communication with a wireless application protocol gateway 118 (WAP GW).

The HLR 106, as is known in the art, includes a database of customer (subscriber) information including customer profiles utilized in mobile (cellular) networks. In addition, the HLR 106 accesses customer information from the carrier's customer service system 102 and a location server 104. In exemplary embodiments of the present invention, the HLR 106 will record whether the customer is a subscriber to the notification service. If the customer is a subscriber, the HLR 106 will send a message to the notification application via a network 124, such as the Internet, when the customer telephone 130 is powered on and in the mobile network. In exemplary embodiments of the present invention, the HLR 106 sends information to the notification application through a firewall 120 and via a router 122 and the network 124.

In alternate exemplary embodiments of the present invention, the location server 104 extracts base station 132, or cell site, location information from the HLR 106 and device specific location information (e.g., GPS based location) from the device, or telephone 130. The location server 104 may then make this location information available to the application servers 126. Alternatively, the HLR 106 may take the location information from the location server 104 and send it to the application servers 126.

The network 124 depicted in FIG. 1 may be any type of known network including, but not limited to, a wide area network (WAN), a local area network (LAN), a global network (e.g. Internet), a virtual private network (VPN), and an intranet. The network 124 may be implemented using a wireless network or any kind of physical network implementation known in the art.

FIG. 1 also includes a database for storing notification application data. The storage device 128 depicted in FIG. 1 may be implemented using a variety of devices for storing electronic information. It is understood that the storage device 128 may be implemented using memory contained in one or more of the server systems 126 or it may be a separate physical device. The storage device 128 is logically addressable as a consolidated data source across a distributed environment that includes a network 124. The physical data accessed via the storage device 128 may be located in a variety of geographic locations depending on application and access requirements. Information stored in the storage device 128 may be retrieved and manipulated via the server systems 126. The storage device 128 includes a notification database. In exemplary embodiments of the present invention, the notification database is relational and includes one or more records correlating a mobile telephone customer with other mobile telephone customers that have allowed the mobile telephone customer to view their current mobile telephone status. The storage device 128 may also include other kinds of data such as information concerning the creating and modification of the notification database records (e.g., date and time of creation). In exemplary embodiments of the present invention, one or more of the server systems 126 operate as a database servers and coordinate access to application data including data stored on storage device 128.

The application servers 126 execute one or more computer programs to facilitate the notification process. The processing is described in more detail below and may include having all of the notification application residing on the server 126 or sharing the processing of the notification application between the server 126 and the cellular telephone 130. All or portions of the notification application may be located on a server 126 such as a wireless markup language (WML) or wireless application protocol (WAP) server, an HTML server, a Java application server, or a BREW application server. In exemplary embodiments of the present invention, portions of the notification application may also be located on the cellular telephone 130.

Figure 2:
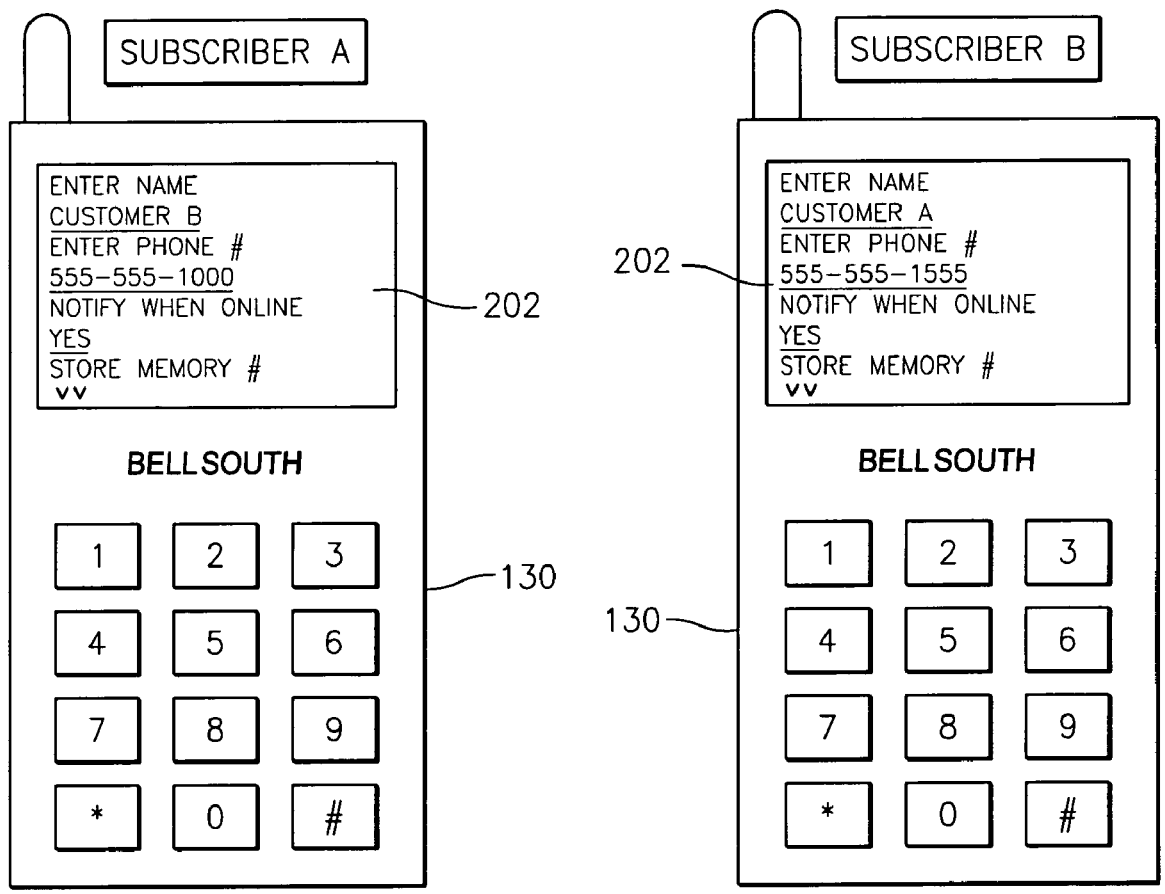
FIG. 2 depicts an exemplary customer interface for providing a mobile network notification service.

FIG. 2 depicts an exemplary customer interface for providing a mobile network notification service. Exemplary embodiments of the present invention send and receive updates to and from the mobile network regarding the availability status of other mobile customers. For example, as depicted in FIG. 2, Subscriber A and Subscriber B can load each other's telephone number into both of their telephones 130. Subscriber A's telephone communication area 202 includes Subscriber B's name, telephone number and instructions to notify Subscriber B when Subscriber A is connected to the mobile network. Similarly, Subscriber B's telephone communication area 202 includes Subscriber A's name, telephone number and instructions to notify Subscriber A when Subscriber B is connected to the mobile network. In addition, Subscriber B processes screens in the telephone communication area 202 to request that status of Subscriber A and vice-versa. In response to processing these screens, the notification service application checks the status of Subscriber A and Subscriber B periodically to determine if their telephones 130 are powered on and in the mobile network.

Figure 3:
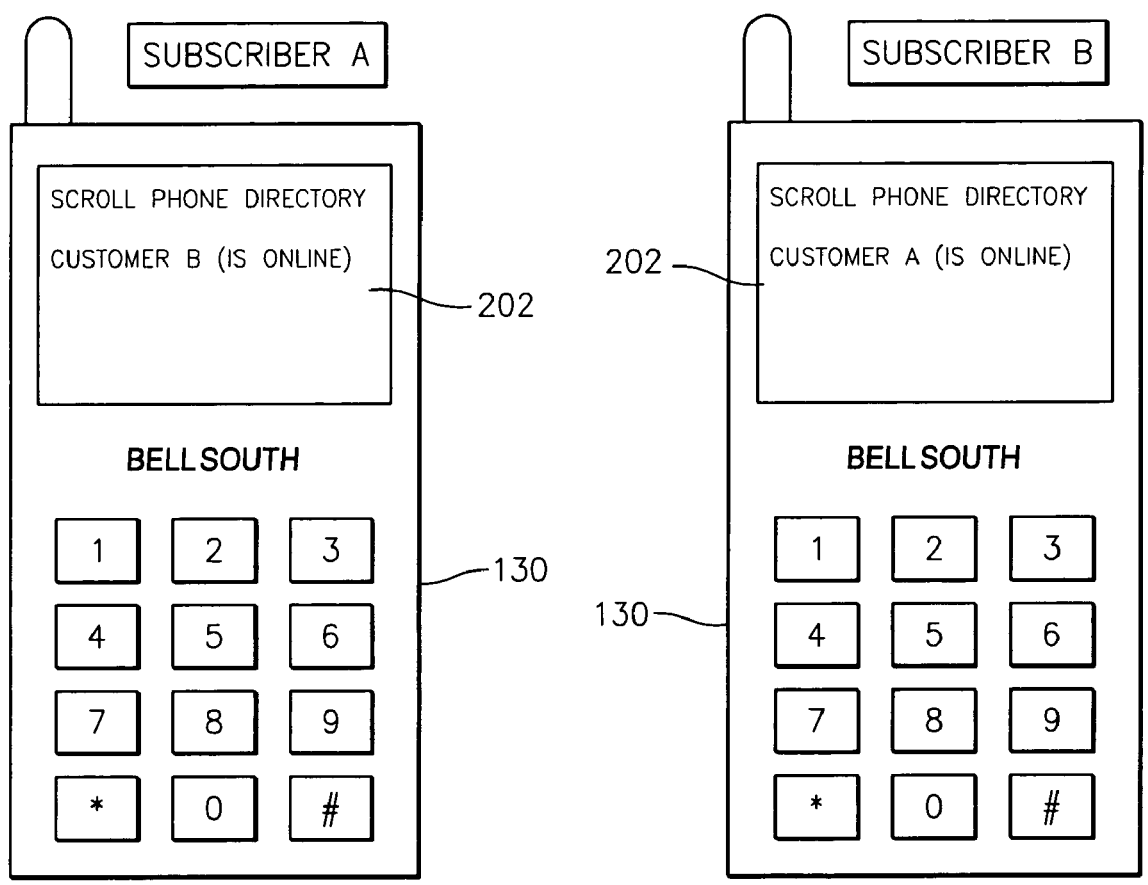
FIG. 3 depicts an exemplary customer interface for providing a mobile network notification service.

FIG. 3 depicts an exemplary customer interface for providing a mobile network notification service. After the notification service application processes the screens described in reference to FIG. 2, the telephone communication areas 202 on the subscriber telephones 130 contain information about the availability status of the other subscriber. Either subscriber may then send the other an instant message or may make a telephone call to the other. In an alternate exemplary embodiment of the present invention, either subscriber may also determine an approximate physical location of the other. The notification application may obtain this information via the location server 104.

Figure 4:
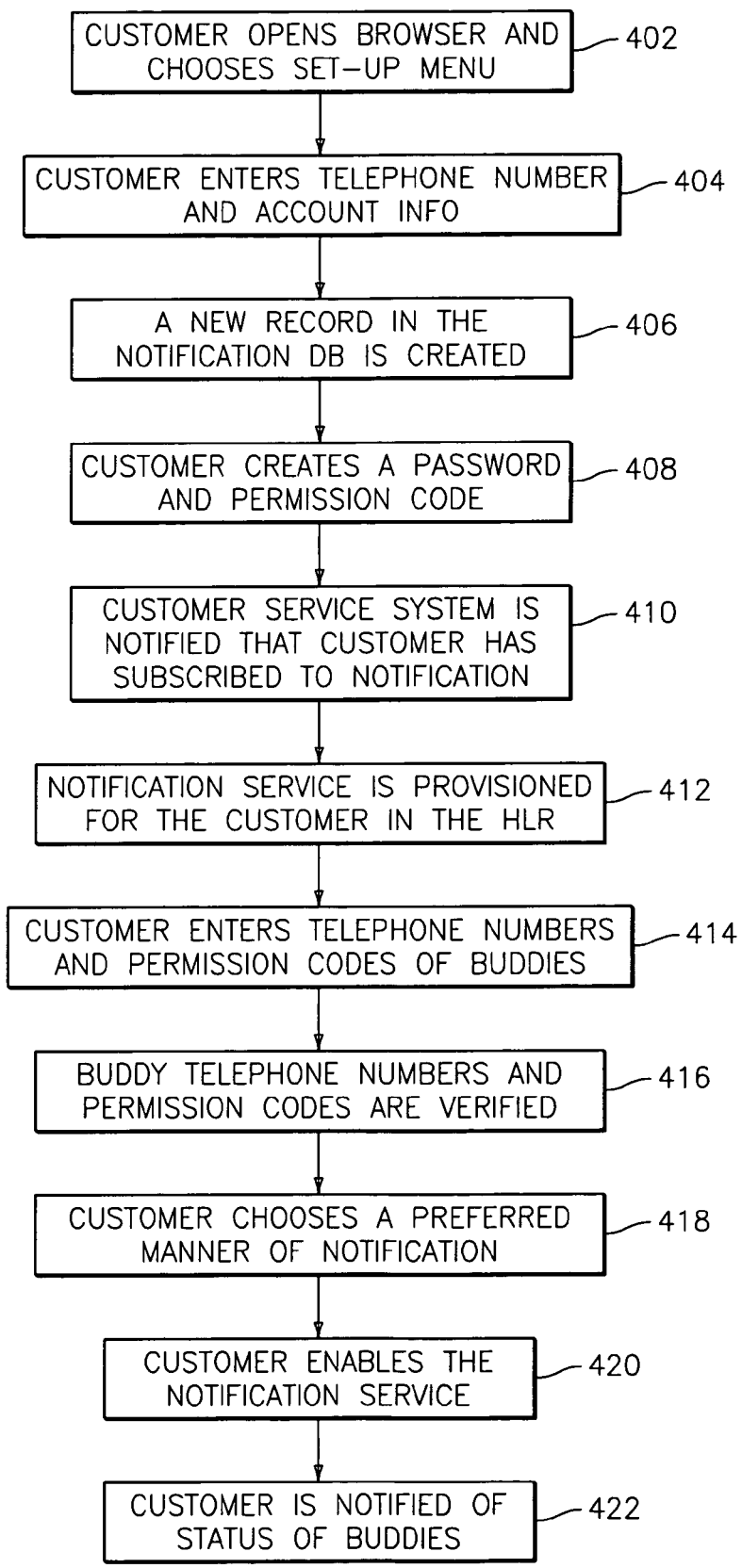
FIG. 4 depicts an exemplary process by which a customer may provision a notification service through a browser application.

FIG. 4 depicts an exemplary process by which a customer may provision a notification service when the notification application is implemented through a browser application that resides on a server 126. The result of this process is that the mobile telephone customer has established a notification list that includes other mobile telephone customers whose status the mobile telephone customer will track. Another result is that the notification list is enabled and therefore the status is tracked and communicated to the mobile telephone. The mobile telephone customer establishes a notification list via a web page, which may be implemented in HTML, WAP, WML or other type of browser known in the art.

At step 402, the mobile telephone customer opens the browser and selects the set-up menu for the notification application from the options presented in the communication area 202 on the customer telephone 130. Next, at step 404, in response to the application request, the customer enters his telephone number and information about the customer account that uniquely identifies the customer. The notification application then verifies the telephone number and customer information against data contained in the customer service system 102 database. If the information is not valid, then an error message is sent to the customer telephone communication area 202 via the browser and the customer is again asked to enter a telephone number and identification information. After a pre-selected number of failed attempts, the customer is advised to contact customer service.

Once the information entered by the customer is verified, step 406 is performed to create a new record in the notification database located on the storage device 128. Next, at step 408, the customer creates a customer password and permission code in response to prompting from the notification application displayed in the telephone communication area 202. The customer password allows the customer to make changes to their notification application profile (e.g., changing the notification list, disabling/enabling the notification application, deactivating the feature). The notification application adds the customer password to the profile of the customer in the notification database located on the storage device 128. The permission code allows other customers to add the customer to their "buddy list." The notification application adds the permission code entered by the customer to the profile of the customer in the notification database. At step 410, the customer service system 102 is notified that the customer has subscribed to the notification service.

Next, at step 412, the notification service is provisioned for the customer in the HLR 106. The notification service may be provisioned in the HLR 106 via "class of service" or similar means. In exemplary embodiments of the present invention, the class of service for the notification feature includes a "registration trigger" and a "de-registration trigger." The telephone 130 powers on and registers to the network, then the class of service for this feature enables the registration trigger and sends a message to the notification application, located on a server 126, that the telephone is turned on and active in the network. When the telephone 130 is turned off and de-registers from the network, the class of service for this feature enables the de-registration trigger and sends a message to the notification application that the telephone is turned off and no longer active on the network.

At step 414, the customer enters the telephone numbers and permission codes of other customers to be added to the customer's notification list in response to prompting by the notification application. The notification application requests the customer, via the telephone communication area 202, to enter the telephone number of another customer (i.e., a "buddy"). For security reasons, the customer must know a permission code associated with the telephone number of the buddy. The notification application requests the customer to enter the permission code associated with the buddy. At step 416, the notification application verifies that the telephone number and permission code for the buddy are valid by making a query to the notification database located on the storage device 128. If the telephone number/permission code combination entered by the customer is not valid, then an error message is sent to the customer telephone communication area 202 via the browser. The error message is displayed on the customer's telephone communication area 202. After a pre-selected number of failed attempts, the notification application tells the customer to contact their buddy and verify the permission code or call customer service.

The customer enters a preferred manner of notification at step 418 in response to prompts from the notification application. The notification application looks at the browser code for the current session and determines if the browser is associated with a mobile device and if it has "push" capability. The notification application queries the customer service system 102 and determines if the subscriber has short message service (SMS) supported by a SMSC 108 and voice mail 110. The notification application then presents the choices for notification to the customer in the customer telephone communication area 202 located on the customer telephone 130. In exemplary embodiments of the present invention the notification application presents the choices for notification to the customer in the following order, depending on the device capability of the telephone 130 and features to which the customer has subscribed: push notification via the browser or if the customer does not have a browser with this capability, the notification will be via a web page for the customer; SMS push notification; SMS pull notification; voice mail. The customer may choose one or more of these options for notification.

Next, at step 420, the customer enables the notification service in response to a prompt from the notification application in the telephone communication area 202. The customer may request that the application be enabled automatically each time the customer powers on the telephone 130. Alternatively, the customer may manually enable the application through a menu in the telephone communication area 202 located on the customer's telephone 130. When the notification application is enabled, the application sets a flag in the notification database to show that the customer has enabled it, and at step 422, the application notifies the customer of all buddies who are on the cellular telephone network and who have enabled their notification application in the preferred manner(s) selected by the customer.

Figure 5:
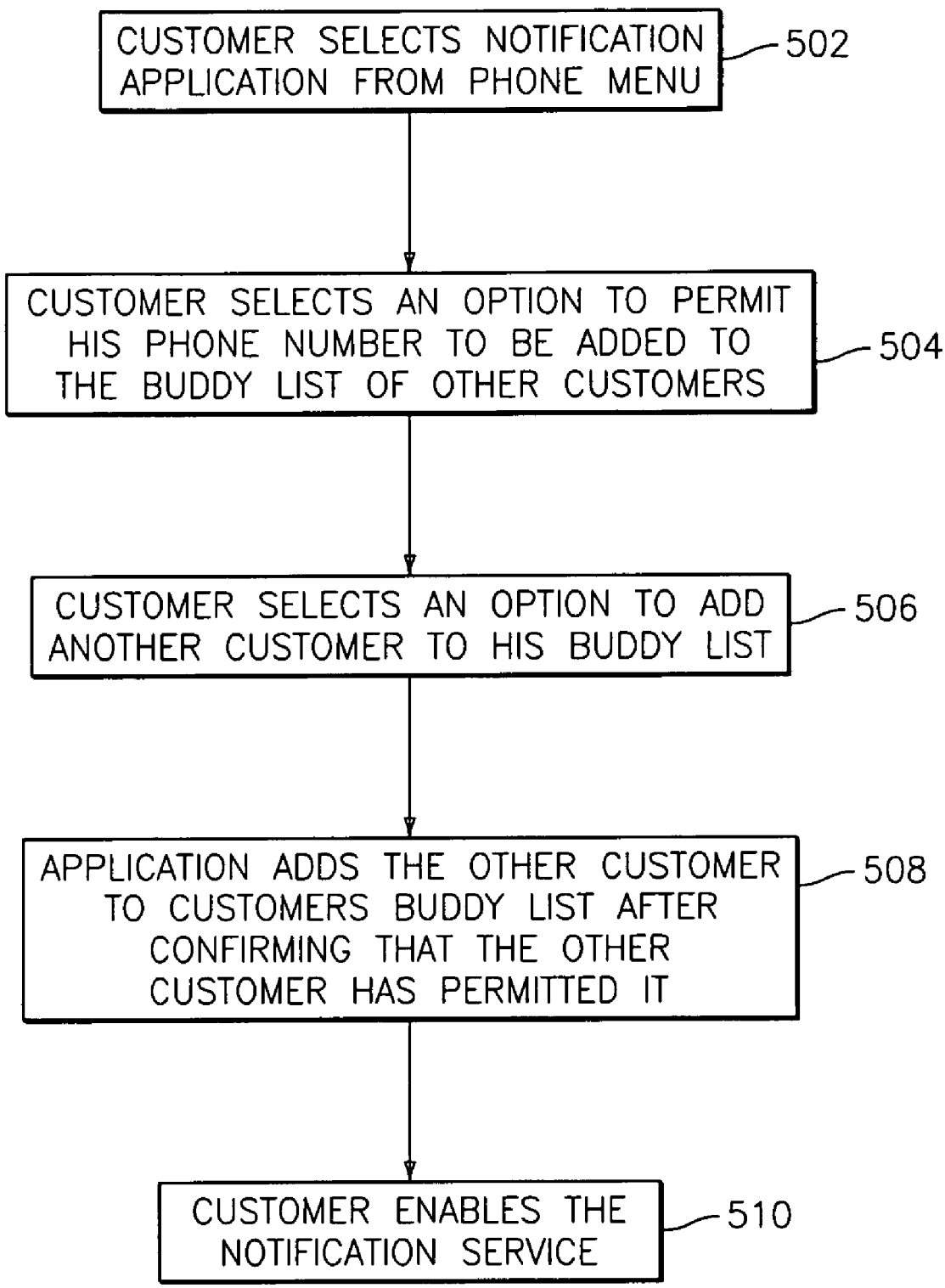
FIG. 5 depicts an exemplary process by which a customer may provision portions of a notification service through an application that resides in the customer telephone.

FIG. 5 depicts alternate exemplary embodiments of the present invention which may be utilized to allow a customer to provision portions of a notification service through an application that resides partially in the customer telephone 130 and partially on a server 126. The notification application may be installed in the telephone 130 during manufacture or it may be downloaded into the telephone 130 as a JAVA (e.g., J2ME) application or similar download application. The notification application contains the address book for the customer and the ability to communicate with network components to know if any of the telephone numbers in the address book are active on the network at any time. The customer may enter telephone numbers in the address book using the notification application located on the telephone 130. The notification application gives the customer the option to make the telephone number just entered part of the "buddy list." The customer also has an option in the menu of the telephone 130 to permit his number to be added to the notification list of other customers. In addition, the customer has the ability to use the menu of the telephone to enable or disable the notification feature. When the feature is enabled, all other buddies who have enabled the notification feature will receive a notification when their "buddies" turn on their telephones 130 (register to the network). Also, they will receive notification when their "buddies" sign off of the network.

Referring to FIG. 5, where the application is split between a telephone 130 and a server 126, the customer may request the location of his "buddies" who are active on the network. The client application in the telephone 130 will access the host application in the server 126, then the application in the server 126 will extract the location information of the "buddy" from the location server 104. The application in the server 126 updates the location of the "buddy" in the database 128 and sends the information to the client application in the telephone 130 of the user who requested the location information. The application in the client telephone 130 displays the location information associated with the "buddy." In the event that the "buddy" is not active on the network, the application server 126 will access the most recent location from the database 128 and send that information to the client application in the telephone 130 with a message that this is the last known location of the "buddy."

Referring to FIG. 5, establishing a notification list with the address book on the customer telephone 130 begins at step 502 when the customer selects the notification application from the menu on the customer telephone 130. At step 504, the customer selects an option to permit the customer telephone number to be added to the notification list of other customers. This may be limited to specific telephone numbers or to any telephone number that knows the permission code associated with the customer. When the customer selects the option to turn on permission, the notification application in the telephone sends an update to the server application residing on a server 126. The first time that the customer turns on permission, the server application creates a new record in the notification database located on the storage device 128 and informs the customer service billing system that the customer has activated this feature. The server application updates the customer profile in the notification database 128 to indicate that the customer has permitted his number to be added to other customers' "buddy lists."

At step 506, the customer selects an option to add another user to the customer's "buddy list." When the customer creates or accesses the telephone number of another customer, the customer may enable an option to add the telephone number to the customer's "buddy list." At step 508, the telephone portion of the notification application adds the other customer to the customer's notification list after confirming that the other customer has permitted the notification. The notification application in the telephone 130 then sends the updated notification list information to the server application located on an application server 126. The server application checks the notification database 128 for the new telephone number that the customer wants to add to the notification list and confirms that the owner of this telephone number has permitted this customer to add the number to his "buddy list." If the telephone number has permission to be added to the customer notification list, the server application updates the customer profile in the database with the new "buddy list." In addition, the server application instructs the portion of the notification application located in the telephone 130 to illuminate an icon next to the telephone number in the address book, to indicate that the number is on the "buddy list." If the number does not have permission to be added to the customer "buddy list," the server application sends a message to the telephone communication area 202 of the customer telephone 130 that says that the owner of the telephone number has not granted permission to add this number to the notification list or that the owner of this telephone number does not use the notification service.

The customer may enable the notification service at step 510 by using an option in the telephone 130. When the application is enabled or disabled, the notification application located in the telephone 130 sends a message to the server notification application. The server notification application updates the customer profile in the notification database to show the status of the notification application for this customer as either enabled or disabled.

Figure 6:
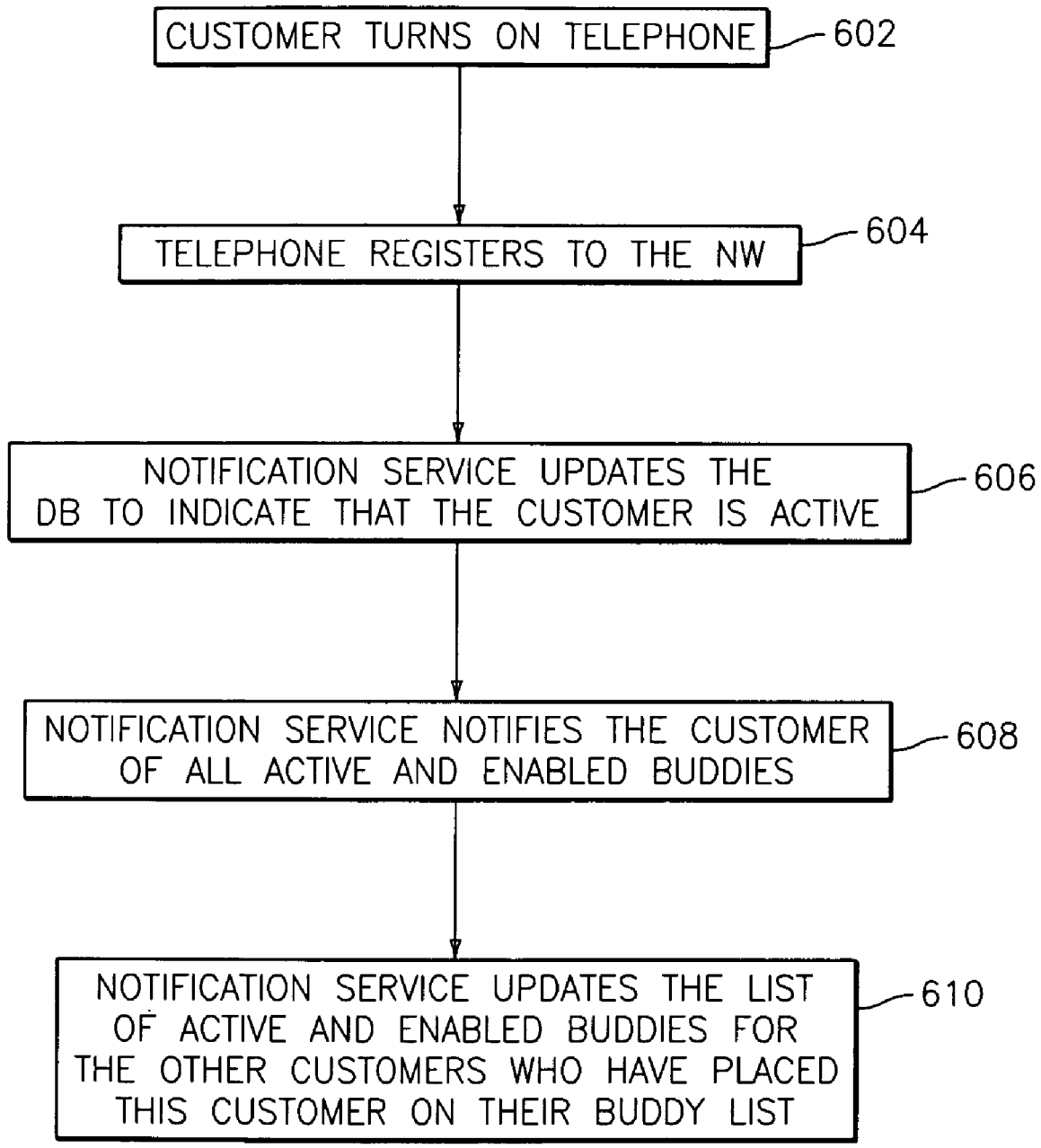
FIG. 6 depicts an exemplary telephone call process for utilizing a mobile network notification service.

FIG. 6 depicts an exemplary telephone call process for utilizing a mobile network notification service. At step 602, the customer powers on the telephone 130 and at step 604, the telephone 130 is registered to the network. As part of registering to the network, the HLR 106 sets a record to indicate that the telephone 130 is on the network. Next, at step 606, the notification service updates the notification database, located on the storage device 128, to indicate that the customer is active. In exemplary embodiments of the present invention, the HLR 106 has a feature that is associated with the notification application. This feature is a class of service or similar means. The class of service for this feature has a registration trigger and a de-registration trigger. When the telephone 130 turns on and registers to the network, the class of service for this feature enables the registration trigger and sends a message to the notification application that the telephone 130 is powered on and active on the network. When the notification application is split between the telephone 130 and a server 126, the message is sent to the server portion of the notification application. The notification application (server portion when portions of the application reside on the telephone 130) updates the customer profile in the notification database to indicate that the customer is active on the telephone network and then it queries the database to see if the notification application is enabled. If the notification application has not been enabled at this point, then the customer must manually enable the application by opening the notification application from the menu located in the telephone communication area 202 of the telephone 130 and choosing the option to enable the notification application.

At step 606, the notification service updates the notification database to indicate that the customer is active. The notification application (server portion when portions of the application reside on the telephone 130) scans the notification list for the customer and checks the profile of all of the customers on the notification list to see which have enabled the application and which also have telephones that are active on the network. If portions of the notification application reside in the telephone 130, then the server application sends a message to the application in the telephone 130 that illuminates the icons next to the telephone numbers of all active and enabled "buddies" associated with the customer's "buddy list."

In alternate exemplary embodiments of the present invention, that include having the notification application located on a server 126 and accessed via a browser, the notification application creates a list of all active and enabled "buddies" associated with the customer's "buddy list." The application notifies the customer of the list of all active and enabled "buddies" using one of the following manners as defined in the customer profile in the notification database: the application makes this list available to the customer on a web page; using the push capability in the browser, the application send the list of active and enabled "buddies" to the customer; using the SMS feature, the application sends the list via SMS; or using the voice mail system 110, the application creates a voice record of the list and makes this available as a menu feature in the voice mail system.

At step 610, the notification service (server portion when portions of the application reside on the telephone 130) updates the list of active and enabled "buddies" for the other customers who have place this customer on their "buddy list." If the customer turns off their telephone 130, the class of service feature utilizes the de-registration trigger and sends a message to the host application that the customer has turned off their telephone 130. The notification application (server portion when portions of the application reside on the telephone 130) updates the customer profile in the notification database to show that the customer is no longer active on the network. In addition, the notification application (server portion when portions of the application reside on the telephone 130) notifies all other customers that have placed this customer on their notification list that this customer is not available. If the customer manually disables the notification feature, and the notification application is split between the telephone 130 and a server 126, then the application in the telephone sends a message to the server application to disable the notification feature. The notification application (server portion when portions of the application reside on the telephone 130) updates the customer profile in the notification database to show that the feature is not enabled for this customer. Also, the notification application (server portion when portions of the application reside on the telephone 130) sends a message to the customers who have placed this customer on the notification list to turn off the icon next to this customer's telephone number to indicate that the customer is not available.

The ability for a mobile telephone customer to see the availability of friends, business colleagues and other individuals may encourage them to use the provider network and may lead to increased airtime. In addition it allows mobile telephone customers to utilize instant messaging in a mobile telephone environment. Further exemplary embodiments of the present invention may be utilized, with permission of the other customers, to keep track of approximate locations of other mobile telephone customers.

As described above, the present invention can be embodied in the form of computer-implemented processes and apparatuses for practicing those processes. In an exemplary embodiment, the invention is embodied in computer program code executed by the server. The present invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing a mobile network notification service comprising:
   establishing a notification list associated with a first notification service customer;

adding a second notification service customer to said notification list in response to a request of said first notification service customer;

receiving a first telephone number associated with said first notification service customer;

receiving an indication that a first telephone corresponding to said first telephone number has been powered on and is available in a mobile network;

determining a mobile network status of a second telephone corresponding to a second telephone number associated with said second notification service customer in response to locating said second telephone number in said notification list associated with said first notification service customer; and transmitting said status to said first notification service customer.

2. The method of claim 1 further comprising transmitting said indication to a third notification service customer in response to locating said first telephone number in a notification list associated with said third notification service customer.

3. The method of claim 2 wherein said transmitting said indication is password protected by said first notification service customer.

4. The method of claim 2 further comprising:
receiving an indication that said first telephone has been powered off and is no longer available is said mobile network; and
transmitting said indication that said first telephone has been powered off to said third notification service customer in response to locating said first telephone number in said notification list associated with said third notification service customer.

5. The method of claim 2 wherein said indication is transmitted to a voice mail system accessible by said third notification service customer.

6. The method of claim 2 wherein said indication is transmitted to a web page accessible by said third notification service customer.

7. The method of claim 2 wherein said indication is transmitted to a third telephone associated with said third notification service customer.

8. The method of claim 2 wherein said indication is transmitted to a short messaging service accessible by said third notification service customer.

9. The method of claim 1 wherein said determining is initiated by said first telephone.

10. The method of claim 1 wherein said determining is initiated by a server in communication with said first telephone.

11. The method of claim 1 wherein said determining is performed on a pre-selected periodic basis.

12. The method of claim 1 further comprising transmitting an instant message to said second telephone.

13. The method of claim 1 further comprising determining a geographic location of said second telephone and transmitting said geographic location to said first notification service customer.

14. The method of claim 1 wherein said status of said second telephone is displayed on said first telephone.

15. The method of claim 1 wherein said indication is received from a home location register located in said mobile network.

16. The method of claim 1 further comprising:
transmitting said indication to a second notification service customer in response to locating said first telephone number in a notification list associated with said second notification service customer, wherein said second notification service customer is associated with said second telephone number.

17. The method of claim 1 wherein said transmitting said status is password protected by a second notification service customer associated with said second telephone number.

18. A system for providing a mobile network notification service comprising:
a network;
an application server in communication with said network; and
a first telephone in communication with said network, said first telephone corresponding to a first telephone number, associated with a first notification service customer, and including instructions to implement a method including:
establishing a notification list associated with said first notification service customer;
adding a second notification service customer to said notification list in response to a request of said first notification service customer;
transmitting an indication to said application server via said network that said first telephone has been powered on and is available in a mobile network;
transmitting a request to said application server to determine a mobile network status of a second telephone associated with said second notification service customer corresponding to a second telephone number in response to locating said second telephone number in said notification list associated with said first notification service customer;
receiving said status via said network; and
displaying said status on said first telephone.

19. The system of claim 18 wherein said network is the Internet.

20. The system of claim 18 wherein said application server is implemented in Java.

21. A system for providing a mobile network notification service comprising:
a network; and
an application server in communication with said network, said application server including instructions to implement a method including:
establishing a notification list associated with a first notification service customer;
adding a second notification service customer to said notification list in response to a request of said first notification service customer;
receiving a first telephone number associated with said first notification service customer via said network;
receiving an indication via said network that a first telephone corresponding to said first telephone number has been powered on and is available in a mobile network;
determining a mobile network status of a second telephone corresponding to a second telephone number associated with said second notification service customer in response to locating said second telephone number in said notification list associated with said first notification service customer; and
transmitting said status to said first notification service customer via said network.

22. The system of claim 21 wherein said network in the Internet.

23. The system of claim 21 wherein said application server is implemented in wireless markup language or wireless application protocol.

24. The system of claim 21 wherein said application server is implemented in hypertext markup language.

25. A computer program product for providing a mobile network notification service comprising:

a storage medium readable by a processing circuit and storing instructions for execution by the processing circuit for performing a method comprising:

establishing a notification list associated with a first notification service customer;

adding a second notification service customer to said notification list in response to a request of said first notification service customer;

receiving a first telephone number associated with said first notification service customer;

receiving an indication that a first telephone corresponding to said first telephone number has been powered on and is available in a mobile network;

determining a mobile network status of a second telephone corresponding to a second telephone number associated with said second notification service customer in response to locating said second telephone number in said notification list associated with said first notification service customer; and transmitting said status to said first notification service customer.

* * * * *